United States Patent [19]

Miller

[11] 4,207,622

[45] Jun. 10, 1980

[54] DIRECTION-FINDING ARRAY OF CROSSED DIPOLES

[75] Inventor: Harry B. Miller, Niantic, Conn.

[73] Assignee: The United States of America as represented by the Secretary of the Navy, Washington, D.C.

[21] Appl. No.: 895,838

[22] Filed: Apr. 13, 1978

[51] Int. Cl.² .............................................. G01S 3/80
[52] U.S. Cl. .................................................... 367/126
[58] Field of Search ............................. 340/6 R, 16 R

[56] References Cited

U.S. PATENT DOCUMENTS

| | | | |
|---|---|---|---|
| 3,383,690 | 5/1968 | Keller | 340/6 R X |
| 3,935,575 | 1/1976 | Leisterer et al. | 340/6 R X |
| 4,119,942 | 10/1978 | Merklinger | 340/6 R |

Primary Examiner—T. H. Tubbesing

Attorney, Agent, or Firm—Richard S. Sciascia; Arthur A. McGill; Prithvi C. Lall

[57] ABSTRACT

A direction-finding array system which uses a plurality of hydrophones in a crossed dipole configuration and a phase-detection system. It is basically a time-of-arrival (TOA) system which is modified to act like a phase-detection system and is able to share much of the electronics of existing acoustic intercept receivers. Acoustic signals of a high frequency generated by an acoustic target under investigation are apparently heterodyned to obtain corresponding signals of an appropriate lower frequency. The apparently heterodyned signals are then processed in two identical processors giving rise to two outputs which are applied to X- and Y- axes of a cathode ray of oscilloscope or the like to obtain unambiguous bearing information about the acoustic target. Three dimensional bearing angle information is obtained by using a third processor which is identical to the two processors used in a two dimensional case.

9 Claims, 3 Drawing Figures

DIRECTION-FINDING ARRAY OF CROSSED DIPOLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a direction-finding system and more particularly to a direction-finding system which uses a plurality of hydrophones in a crossed dipole configuration for locating acoustic targets generating high acoustic frequencies.

The directivity pattern of a monopole such as a hydrophone is an omnidirectional pattern whereas the directivity pattern response of a dipole pair which is a pressure-gradient system, has a figure-8 pattern. The maximum sensitivity in pressure-gradient systems occurs at the frequency where the ratio of the spatial separation L between the members of the dipole and the wave length of the acoustic signal, i.e., $L/\lambda$, is equal to $\frac{1}{2}$. However, the sensitivity of such a system decreases at the rate of 6dB/octave as the frequency decreases. Consequently, a given spatial separation L between the two hydrophones of the dipole may be too small for low frequency work. At the same time this given separation L may be usually too large for high frequency work. For, somewhat above the dipole peaking frequency where L is equal to $\lambda/2$, grating lobes appear in addition to the simple Cos $\theta$ and Sin $\theta$ patterns, where $\theta$ is the bearing angle. That is, the directional response shows a multi-lobed structure when L is greater than $\lambda/2$. Hence, ideally L should be inversely proportional to the signal frequency, being very large at the low frequencies and very small at the high frequencies.

For the high frequency problem, if L cannot be made small, it would be desirable to find a way to use a relatively large value of L and still have no grating lobes. This means that d or L/2 (half the spatial separation between the two members of a dipole) must always be small as compared to the effective wave length. This implies that at high frequencies, a way must be found to "amplify"$\lambda$, i.e., to convert $\lambda$ into a larger wave length $\lambda'$ so that $L/\lambda'$ will be less than $\frac{1}{2}$, or in other words, the signal frequency would have to be converted to F', a frequency smaller than the signal frequency. Likewise, for low frequency work, it would be desirable to convert the signal frequency to a higher frequency, thus making the ratio of L, the spatial separation, and the new wave length to be of the order or $\frac{1}{2}$ or less. However, the signal frequency cannot readily be converted to a higher or lower frequency while the acoustic wave is in the acoustic medium; and once the signal has been received simultaneously by two hydrophones, the interference patterns preordained by the geometry and the wave length are basically unchangeable. Thus, in order to change the wave length of the acoustic signal at high or low frequencies, it is desirable to devise a system where each received signal, at input frequency $f_i$, would be apparently heterodyned to produce an arbitrary fixed output frequency f' which is referred to as the post-processing frequency. The fixed spatial separation L will be chosen to be such that it is of the order of $\lambda'/2$ where $\lambda'$ is the wave length associated with frequency F'. The frequency response of a dipole pair then would no longer be limited at the upper end of the band by the dipole peaking frequency but rather by the first mechanical resonance of the individual monopole.

SUMMARY OF THE INVENTION

A direction-finding array of crossed dipoles according to the teachings of subject invention is a system wherein each received signal at input frequency $f_i$ is apparently heterodyned to produce an arbitrary fixed output frequency f'; and L, the spatial separation between the two members of the dipole, is chosen to be equal to the half wave length f'. This system is basically a time-or-arrival (TOA) system which uses the beam-steering apparatus normally used by a phase-detection system. The system includes two crossed dipoles comprising four hydrophones, plus a fifth hydrophone placed at the intersection of the lines joining hydrophones of the each pair of the two crossed dipoles. An input signal of a high frequency appearing in the form of a gated-burst is received by hydrophone 1 and also by hydrophones 2, 3, 4 and 5 at different times. The signal from hydrophone 1 has followed a certain path, has been mixed with some ambient noise in the acoustic medium and is amplified, filtered and fed into channel 1 of the two identical signal processors, Sum Box 1 and Sum Box 2. The gated-burst-plus-noise (i.e., noisy signal) is detected by a variable threshold envelope detector which cleans the baseline of the signal, i.e., the amount of baseline noise mixed with the signal is in effect reduced by means of an automatic threshold detector. The signal is then enveloped-detected and then sharpened by a comparator. This produces a "box-car" or digital gating signal which is equivalent to the envelope of the input signal and contains some of the necessary information regarding the bearing of the source of the input acoustic signals. A divide-by counter with a free-running clock is controlled by the digital gating signal. The output is thus a gated-burst of lower frequency with the frequency controlled by the divide-by counter. Thus, the original gated-burst of a certain frequency has been frequency-translated or "heterodyned" to a gated-burst of a lower frequency. However, the original analog signal is now in the form of a digital signal. The new digital signal is then converted to a quasi-analog signal by means of an AC restorer. The same process is repeated with the noisy signal in channel 3 for hydrophone 3 at the same time. The outputs in channel 1 and channel 3 are now summed with proper phase relationship to give a "difference" output and thus a figure-8 pattern. This pattern can be improved by using integrators which produce variable-amplitude triangular waves in place of constant-amplitude rectangular waves; and these triangular waves are used for further processing. At the same time the noisy signals in channel 2 from hydrophone 2 and channel 4 from hydrophone 4 go through the same process and are summed with proper phase relationship to give a "difference" output and thus a figure-8 pattern made up from either rectangular waves or triangular waves. Provision is made in the system to time-shift one set [1-3] by a quarter period, i.e. 90° phase-shift, with respect to the other set. The [2-4] and phase-shifted [1-3], i.e., [1-3]*, are then summed and the resulting pattern is no longer a figure-8 pattern but rather a nearly omnidirectional pattern. A similar noisy signal from hydrophone 5 in channel 5 undergoes simultaneously the same process as in the other channels, i.e., it has been "heterodyned" to the same lower frequency and then either integrated or filtered to produce a triangular wave. It is now analog-multiplied with the above summation of [2–4] and [1–3]*. The product consists of an AC term, which is filtered out via a low-pass RC-filter, and a DC term which is preserved. The amplitude, positive or negative, of this DC term varies with the incoming signal direction $\theta$ and is proportional to $\cos \theta$. A second identical signal processor, Sum Box 2, is used in parallel with the first, Sum Box 1, but the time shifting here is slightly different. Thus, the incoming signal to channels 1 and 3 producing [1–3 or a signal proportional to $\sin w_i t /\cos \theta$ is not phase-shifted; but the incoming signal producing [2–4] or a signal proportional to $\sin w_i t \sin \theta$ is now time-shifted by a quarter of a period or a 90° to become $\cos w_i t \sin \theta$. These terms when multiplied with channel 5, i.e., $\cos w_i t$, produce a DC term proportional to $\sin \theta$. These two DC signals are then applied to the X-axis and Y-axis of CRO; (i.e., one from the first processor which is proportional to $\cos \theta$ and the second one from the second processor which is proportional to $\sin \theta$) and a cursor is generated which has one-to-one correspondence with the angular position of the incoming acoustic wave. The bearing information of the acoustic target is thereby obtained.

One object of subject invention is to have a direction-finding array of crossed dipoles which is useful at high frequencies. Another object of the subject invention is to have a direction-finding array of crossed dipoles which is used for high frequencies but which uses the electronic circuitry of existing acoustic interceptor receiver systems.

Still another object of subject invention is to use a direction-finding array of crossed dipoles which produces unambiguous directional information, even at frequencies where the prior art devices show quite ambiguous direction-finding information.

Still another object of subject invention is to have a direction-finding array system of crossed dipoles where the distance between the members of a dipole is much larger than the wave length of the incoming acoustic signal.

Other objects, advantages and novel features of the invention will become apparent from the following detailed description of the invention when considered in conjunction with the accompanying drawings wherein:

BRIEF DESCRIPTION OF THE DRAWINGS

FIG. 3 is a representation of the electrical pulses at various positions of the electronic components of the block diagram of FIG. 2.

DESCRIPTION OF A PREFERRED EMBODIMENT

Figure 1:
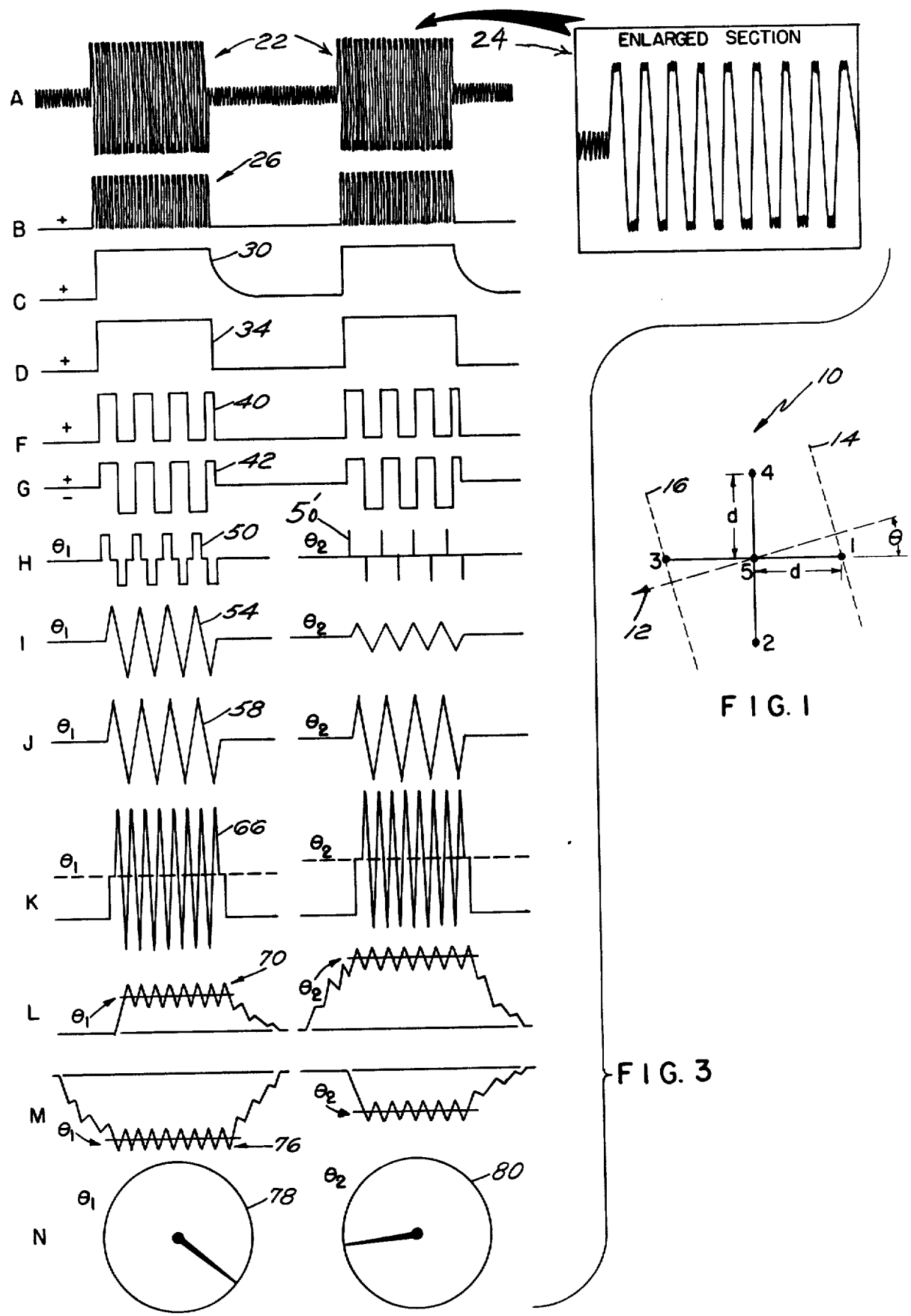
FIG. 1 is a diagrammatic representation of the positions of the five hydrophones of a direction-finding array placed in the acoustic field of an acoustic target.

Referring to the drawings, FIG. 1 shows a system 10 using crossed dipoles formed by hydrophones 1 and 3 and 2 and 4. Hydrophone 5 is located at the intersection of the two lines joining dipole components 1 and 3 and 2 and 4 respectively. An incoming acoustic signal in the form of a gated-burst of high frequency, i.e., of the order of a few hundred kilohertz (hereinafter referred to as kHz) and moving in the direction of arrow 12, makes an angle $\theta$ with the straight line joining hydrophones 1, 3 and 5. Lines 14 and 16 indicate positions of the acoustic wave front at different time intervals as the wave front passes from hydrophone 1 to hydrophone 3. As shown in FIG. 1, d is half the spatial distance L between the two members of a dipole and thus is equal to L/2. The wave length of the incoming acoustic signal is designated by $\lambda$. As an incoming acoustic plane wave sweeps in the direction of arrow 12, the wave forms representing the acoustic signal received at hydrophone 5, which is taken as the origin, and at the other four hydrophones are represented by:

$r_5(t) = s(t) + \text{noise}$ $r_1(t) = s(t + d/c \cos \theta) + \text{noise}$ $r_2(t) = s(t - d/c \sin \theta) + \text{noise}$ $r_3(t) = s(t - d/c \cos \theta) + \text{noise}$ $r_4(t) = s(t + d/c \sin \theta) + \text{noise}$ where d is half the spatial distance L between the two members of either of the two dipoles and c is the velocity of the acoustic wave in the medium in which the crossed dipole arrangement is placed and $\theta$ is the bearing angle made by the direction in which the plane wave is moving to the line joining hydrophones 1, 5 and 3.

However, it can be shown that for a burst of sine wave at unknown input frequency $f_i$, the signal wave form s(t) can also be written as the product of the envelope part and the oscillatory part as follows:

$s(t) = e(t) \cos w_i t$ where envelope e(t) is non-zero and constant in the interval representing the duration of the gated-burst. Using this notation, the received acoustic wave form at hydrophone 1 is given by $r_1(t) = e(t + d/c \cos \theta) \cos (w_i t + w_i d/c \cos \theta) + \text{noise}$ Similarly, the received acoustic wave form at hydrophone 3 is:

$r_3(t) = e(t - d/c \cos \theta) \cos (w_i t - w_i d/c \cos \theta) + \text{noise}.$ If we substract these two received tone bursts and assume that the amplitude of the tone burst does not change, as we are dealing with airplane wave front, the normalized voltage $E_{13}$ is then given by:

$E_{13} = \cos (w_i t + k_i d \cos \theta) - \cos (w_i t - k_i d \cos \theta)$
$\phantom{E_{13}} = -2 \sin w_i t \sin (k_i d \cos \theta)$
$\phantom{E_{13}} = -2 \sin w_i t \sin [(\pi L/\lambda_i) \cos \theta]$ where $k_i = w_i/c = 2\pi f_i/c = 2\pi/\lambda_i$ and $d = L/2$ Likewise, the received acoustic wave forms at hydrophones 2 and 4 are:

$r_2(t) = e(t - d/c \sin \theta) \cos (w_i t - w_i d/c \sin \theta)$ $r_4(t) = e(t + d/c \sin \theta) \cos (w_i t + w_i d/c \sin \theta)$ Substracting $r_2(t)$ and $r_4(t)$ and normalizing, the normalized voltage $E_{24}$ is given by:

$$E_{24} = \cos(w_i t - k_i d \sin\theta) - \cos(w_i t + k_i d \sin\theta)$$
$$= -2 \sin w_i t \sin(k_i d \sin\theta)$$
$$= -2 \sin w_i t \sin[(\pi L/\lambda_i) \sin\theta]$$

If $\pi L/\lambda_i$ is sufficiently small, i.e., $\pi L/\lambda_i$ is less than 1, $$\sin[(\pi L/\lambda_i) \cos\theta] \approx (\pi L/\lambda_i) \cos\theta$$

and $$\sin[(\pi L/\lambda_i) \sin\theta] \approx (\pi L/\lambda_i) \sin\theta$$

If the time component of $E_{13}$ is given a 90° phase shift, it becomes $E_{13}^*$ where $$E_{13}^* = -2 \cos w_i t [(\pi L/\lambda_i) \cos\theta]$$

Thus $$\Sigma = E_{13}^* + E_{24} = (-2\pi L/\lambda_i)[\cos w_i t \cos\theta + \sin w_i t \sin\theta]$$
$$= -(2\pi L/\lambda_i) \cos(w_i t - \theta)$$

If we multiply $\Sigma$, the sum of $E_{13}^*$ and $E_{24}$ by the output voltage $E_5$ from the omnidirectional hydrophone 5 which is basically $\cos w_i t$, we get $$(E_5) \times (\Sigma) = (\cos w_i t)(-2\pi L/\lambda_i) \cos(w_i t - \theta)$$
$$= (-\pi L/\lambda_i) \cdot 2 \cos(w_i t) \cos(w_i t - \theta)$$
$$= (-\pi L/\lambda_i)[\cos(w_i t + w_i t - \theta) + \cos(w_i t - w_i t + \theta)]$$
$$= (-\pi L/\lambda_i)[\cos(2 w_i t - \theta) + \cos\theta]$$
$$= -\pi L/\lambda_i \cos\theta + (-\pi L/\lambda_i) \cos(2 w_i t - \theta)$$
$$(E_5) \times (\Sigma) = DC \text{ term} + \text{Doubled Frequency term.}$$

If the double frequency term, i.e., $(-\pi L/\lambda i) \cos(2w_i t - \theta)$ is filtered out, we are then left with a DC term, i.e., $-\pi L/\lambda_i \cos\theta$ which is proportional to the bearing angle.

A DC term, $\pi L/\lambda_i \cos\theta$, is applied to the X-axis of a Cathode Ray Oscilloscope (CRO), after reversing the leads.

Similarly, another DC term, $\pi L/\lambda_i \sin\theta$, is obtained and is applied to the Y-axis of the CRO.

The point or line (cursor) which appears on the CRO gives $\theta$, the azimuth bearing angle of the radiating acoustic source, i.e., the acoustic target.

It should be noted that as $f_i$, the frequency of the incoming acoustic signal, increases; $\lambda_i$ decreases. Thus when $L/\lambda_i$ becomes greater than 1, the figure-8 pattern gives way to a multi-lobed pattern which cannot give an unambiguous bearing solution. However, in the time-difference information is converted into phase-difference information by creating a synthetic, long output wave length $\lambda'_i$, from the original, short input wave length $\lambda_i$ of the input signal, unambiguous figure-8 patterns are obtained. Thus, even though the incoming signal is of too high frequency for the dipole spacing, every incoming signal of a high frequency is first envelope detected, and converted to a DC step. The DC step is then converted into some convenient AC signal having a frequency which is lower than the frequency of the incoming signal. By proper use of the output of the hydrophones 1 and 3; 2 and 4; and 5, two pairs of figure-8 patterns are created at the lower frequency to obtain accurate bearing information. This essentially amounts to processing the bearing information about the acoustic target by using a conventional acoustic intercept receiver phase-sensitive system using acoustic signals which have been heterodyned and have a frequency which is lower than the frequency of the incoming acoustic signals from the acoustic target.

Figure 2:
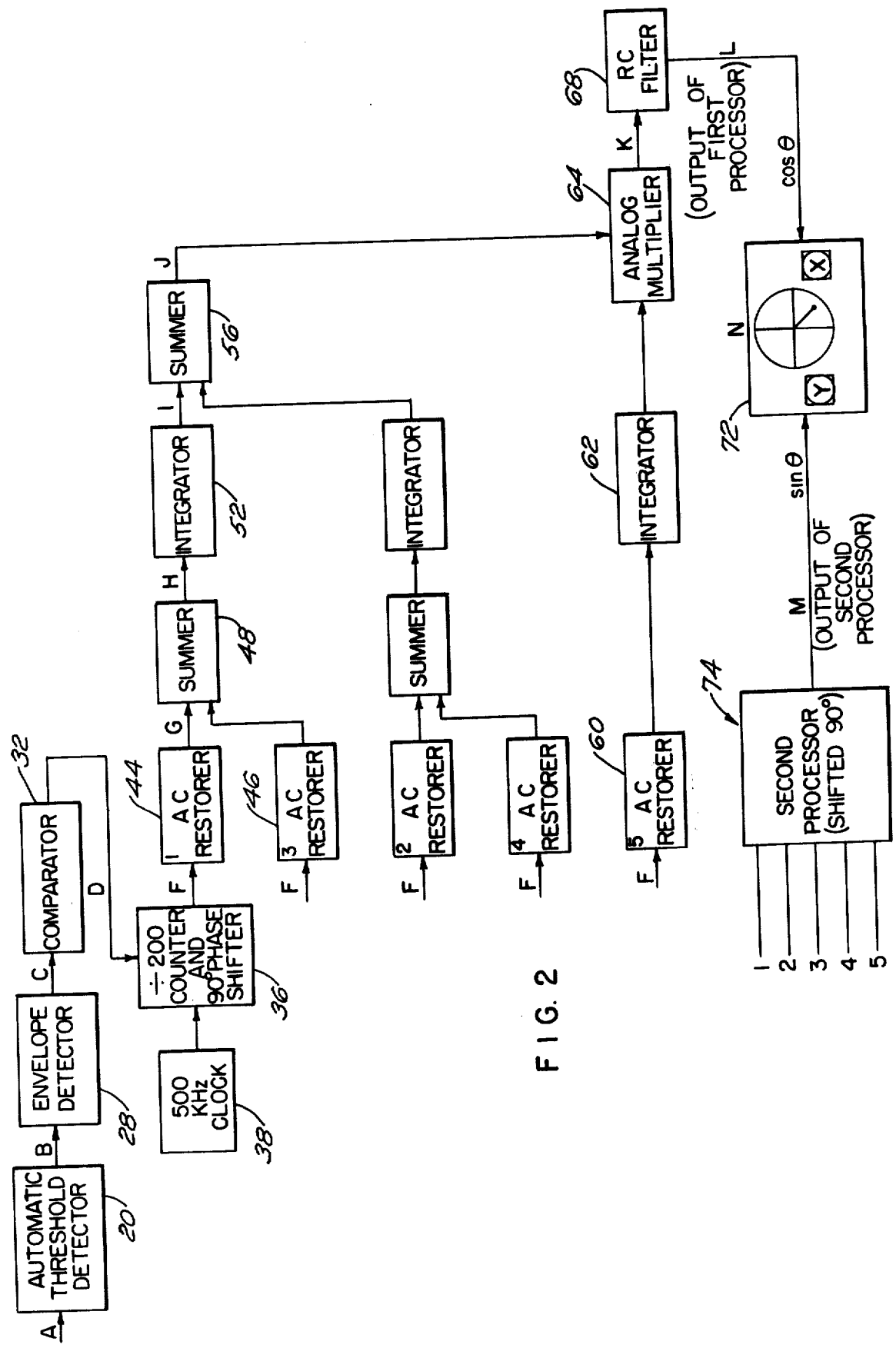
FIG. 2 is a block diagram of the various electronic components used in the processing of the incoming acoustic signal.

The above-identified concept has been used in the embodiment shown in the form of a block diagram in FIG. 2. High frequency acoustic signal in the form of a gated-burst from the acoustic target carrying the bearing information thereof together with ambient noise in the medium is used as input A to automatic threshold detector 20. The function of circuit 20 is to set the baseline below which all the noise is filtered out and the base line is automatically adjusted as the noise level in the acoustic field of the acoustic target changes. This is accomplished preferably by applying the gated-burst plus noise, i.e., the noisy signal through a capacitor and a threshold potentiometer to the negative input terminal of a comparator or detector such as Model LM339 IC or the like. The time average of the peak level of the gated-burst-plus-noise is developed by a diode such as IN914A in conjunction with an associated RC-network and is applied to the positive input of the comparator. This time average level provides an automatically varying threshold which allows the comparator to separate the signal from the noise. Numeral 22 of FIG. 3 indicates the pulse shape of input A to circuit 20 and numeral 24 indicates an enlarged view thereof. The output B of circuit 20, shown by numeral 26 in FIG. 3, is used as input to envelope detector 28 which is preferably an open-collector output of a comparator such as Model LM339 IC in conjunction with a resistor and a capacitor. The output C of envelope detector 28 is shown as pulse representation 30 which is used as an input for comparator 32 so as to obtain sharpened pulses 34 as its output D which is a digital gating pulse representation equivalent to the envelope of the input signal 22. A divide-by counter 36, preferably a divide-by 200 counter, with a free-running clock 38, preferably 500 kHz clock, is controlled by the digital gating signal 34. Thus the original gated-burst of high frequency, $f_i$, generated by an acoustic target, is frequency-translated or "heterodyned" to a gated-burst of a lower frequency $f_i/200$ as an output signal 40, the signal being a digital signal instead of the original analog signal 22. This is accomplished by applying sharpened envelope 34 in parallel to the reset terminals of two decade counters such as Model 7490 decade counters. The output E of clock 38 is applied to the first of the two series-connected counters such as Model 7490 decade counters. The phase shifting by 90° is accomplished by a normal procedure for digital signals, i.e., using a digital delay line. Digital signal 40, shown as waveform F, is then converted to a quasi-analog signal 42, shown as waveform G, by a positive AC restorer 44 which preferably operates by summing the digital signal 40 with an inverted envelope of itself at half amplitude. (This envelope has been summed by means of a resistor network; and the DC component was removed by a capacitor, giving a quasianalog signal 42 which is symmetrical around zero). The output 42 of positive AC restorer 44 of channel 1 is summed with the output of negative AC restorer 46 of channel 3 in summer 48 by using an operational amplifier such as Texas Instrument Model 741. (The resistor network in the AC restorers 44 and 46 form part of the summing network). The output 50, shown as waveform H, or 50' of summer 48 is shown in FIG. 3. A two-stage integrator 52 including two operational amplifiers such as Texas Instrument Model 741 is used with the output of summer 48 as its input, and the gain of each stage and the time constants are optimized to obtain a clean signal 54, shown as waveform I, of frequency $f_i/200$. The same operation is performed at the same time on the signals in channels 2 and 4 and the final summing of channels 1 and 3 and 2 and 4 is done in final summer 56, using an operational amplifier such as Texas Instrument Model 741 so as to obtain an output 58, shown as waveform J, ($\Sigma$), i.e., phase shifted [1–3] or [1–3]* plus [2–4]. The output of hydrophone 5 in channel 5 in processed at the same time using AC restorer 60 and integrator 62. The output 58 ($\Sigma$) of summer 56 is then multipled by the output of integrator 62 by using an analog multiplier 64 such as AD532 so as to give ([1–3]* +[2–4])×5 designated by numeral 66 at K. A low pass filter 68 using a series resistor and a shunt capacitor is used to filter out the AC component of output 66, i.e., of ([1–3]* +[2–4])×5, leaving a DC output 70 (shown at L) of the first processor, Sum Box 1, which is proportional to $\cos \theta$, where $\theta$ is the bearing angle of acoustic target. This output is applied to the X-axis of CRO 72. A second processor 74, Sum Box 2, identical to the first processor described above, is used in parallel with the first processor to process the heterodyned signals in its channels 1, 2, 3, 4 and 5 with a slightly different time-shifting. The signals in channels 1 and 3 produce [1–3] a signal which is proportional to $\sin w_i t \cos \theta$ which is not phase shifted. But the incoming signals in channels 2 and 4 produce a signal proportional to $\sin w_i t \sin \theta$ which is then timeshifted by a quarter period or 90° to change it to [2–4]* or $\cos w_i t \sin \theta$. This is then filtered to give the DC output 76 at M. The DC output 76 which is proportional to $\sin \theta$, is applied to the Y-axis of CRO 72. The inputs applied to the X- and Y-axis of CRO 72 generate cursor, shown on screen 78, which gives the bearing angle information directly. A different bearing angle, i.e., $\theta_2$ generates a cursor on screen 80 as shown in FIG. 3. Thus the two processors, Sum Box 1 and Sum Box 2, provide unambiguous bearing information about the acoustic target by processing high frequency acoustic signals generated therefrom.

Briefly stated, a direction-finding array system of the subject invention uses a plurality of hydrophones in a crossed dipole configuration and is basically a time-of-arrival (TOA) system which is modified to act like a phase detection system. Acoustic signals of a high frequency generated by an acoustic target under investigation are apparently heterodyned to obtain corresponding signals of an appropriate lower frequency. The apparently heterodyned signals are then processed in two identical processors giving rise to two outputs which are applied to X- and Y- axis of a cathode ray oscilloscope or the like to obtain unambiguous bearing information about the acoustic target.

Obviously, many modifications and variations of the present invention may become apparent in the light of the above teachings. As an example, the electronic components such as an automatic threshold detector, envelope detector, comparator, 90° phase shifter, AC restorers, summers, integrators, analog multiplier, RC-filters, etc. can be substituted by their equivalents to accomplish the same objective without deviating from the teachings of the subject invention. It should be noted further that it is not essential to provide a fifth physical hydrophone as it is possible to obtain a virtual hydrophone by appropriately combining the outputs of the remaining four hydrophones. Furthermore, the system can achieve bearing angle information along either XZ-plane or YZ-plane instead of XY-plane by rotating the array by 90°. Besides, if we add two more hydrophones to the array along the Z-axis, we have in effect three dipole pairs covering the three planes, viz, XY-, YZ- and XZ-planes requiring another set of first and second processors to obtain three dimensional analysis of the bearing information of the acoustic source. It is possible to eliminate the seventh hydrophone and require only six hydrophones forming three dipole pairs. Thus, the novel feature of subject disclosure does not lie in the electronic circuitry of the electronic components used. It is therefore understood that within the scope of the appended claims the invention may be practiced otherwise than as specifically described.

I claim:

1. A direction-finding array system for obtaining bearing angle information of an acoustic source generating acoustic signals which comprises:

a crossed dipole array including a first pair of transducers forming a first dipole having a first dipole length and a second pair of transducers forming a second dipole having a second dipole length and a fifth transducer being located at the intersection of the line joining the transducers of said first dipole and the line joining the transducers of said second dipole;

a first processor having five channels with one-to-one correspondence with the five transducers of said crossed dipole array, said first processor processing the output of each of the five transducers of said crossed dipole array in a corresponding channel thereof and generating an output signal proportional to the cosine of the bearing angle of said acoustic source; said first processor further including a threshold detector, an envelope detector, and a divide-by counter in each channel thereof for obtaining from the acoustic signals of said acoustic source corresponding output signals having a fixed frequency higher than the frequencies of the acoustic signals in each channel thereof;

a second processor having five channels with one-to-one correspondence with the five transducers of said crossed dipole array, said second processor processing the output of each of the five transducers of said crossed dipole array in a corresponding channel thereof and generating an output signal proportional to the sine of the bearing angle of said acoustic source; and displaying means for simultaneous displaying of the outputs of said first and second processors to obtain the bearing angle information of said acoustic source.

2. The direction-finding system of claim 1 wherein said first processor further includes an AC restorer in each channel thereof, for converting said output signals of the fixed frequency into a corresponding AC signal.

3. The direction-finding system of claim 2 wherein said first processor further includes a first summer and a first integrator in the two channels corresponding to the two transducers forming said first dipole for combining said output signals from said two channels and giving an output from said first integrator.

4. The direction-finding system of claim 3 wherein said first processor further includes in the other two channels corresponding to the transducers forming said second dipole a second summer and a second integrator for combining said output signals and giving an output from said second integrator.

5. The direction-finding system of claim 4 wherein said first processor further includes a third summer for summing the output of said first integrator and the output of said second integrator.

6. The direction-finding system of claim 5 wherein said first summer further includes an analog multiplier for multiplying the output of said third summer and the output of the fifth channel thereof.

7. The direction-finding system of claim 6 wherein said second processor further includes an AC restorer in each channel thereof, a first summer and a first integrator in the two channels corresponding to the two transducers forming said second dipole for combining said output signals from said two channels and giving an output from said first integrator, a second summer and a second integrator for combining said output signal and giving an output from said integrator thereof, a third summer for summing the output of said first and second integrators thereof.

8. The direction-finding system of claim 7 wherein said displaying means is a cathode ray oscilloscope.

9. The direction-finding system of claim 7 wherein each of said first and second processors includes a filter for filtering the AC component in the outputs of said first and second processors.

* * * * *